United States Patent [19]

Hara

[11] Patent Number: 4,634,096

[45] Date of Patent: Jan. 6, 1987

[54] ELECTROMAGNETIC SOLENOID DEVICE FOR OIL PRESSURE CONTROL

[75] Inventor: Tadayuki Hara, Himeji, Japan

[73] Assignee: Mitsubishi Denki Kabushiki Kaisha, Tokyo, Japan

[21] Appl. No.: 662,153

[22] Filed: Oct. 18, 1984

[30] Foreign Application Priority Data

Oct. 24, 1983 [JP] Japan .......................... 58-164396[U]

[51] Int. Cl.[4] .............................................. F16K 31/06

[52] U.S. Cl. ................................ 251/129.15; 251/50; 251/129.07; 251/129.18

[58] Field of Search ................ 251/50, 129.07, 129.15, 251/129.18

[56] References Cited

U.S. PATENT DOCUMENTS

| | | | |
|---|---|---|---|
| 2,619,116 | 11/1952 | Ralston . | |
| 3,472,483 | 10/1969 | Janczur | 251/129.07 |
| 3,523,676 | 8/1970 | Barker . | |
| 3,593,241 | 7/1971 | Ludwig | 251/129.15 X |
| 3,701,366 | 10/1972 | Tirelli et al. | 251/50 X |
| 4,230,156 | 10/1980 | Frantz | 251/129.15 X |
| 4,346,847 | 8/1982 | Rissi | 251/129.15 X |
| 4,418,848 | 12/1983 | Lunau | 251/129.15 X |

FOREIGN PATENT DOCUMENTS

| | | |
|---|---|---|
| 0032221 | 7/1981 | European Pat. Off. . |
| 423301 | 12/1925 | Fed. Rep. of Germany . |
| 1272664 | 9/1965 | Fed. Rep. of Germany . |
| 1934860 | 1/1966 | Fed. Rep. of Germany . |
| 1871835 | 3/1967 | Fed. Rep. of Germany . |
| 57-035009 | 2/1982 | Japan . |

*Primary Examiner*—Arnold Rosenthal
*Attorney, Agent, or Firm*—Oblon, Fisher, Spivak, McClelland & Maier

[57] ABSTRACT

An electromagnetic solenoid device for oil pressure control comprises a movable iron core for pushing an oil pressure valve body attached at one end of the solenoid device and a space filled with working oil in which the movable iron core is slidably moved, wherein at least one oil pressure releasing part is formed in the movable iron core, extending from the front end to the rear end of the movable iron core in the direction of its sliding movement.

6 Claims, 4 Drawing Figures

FIGURE 1 *PRIOR ART*
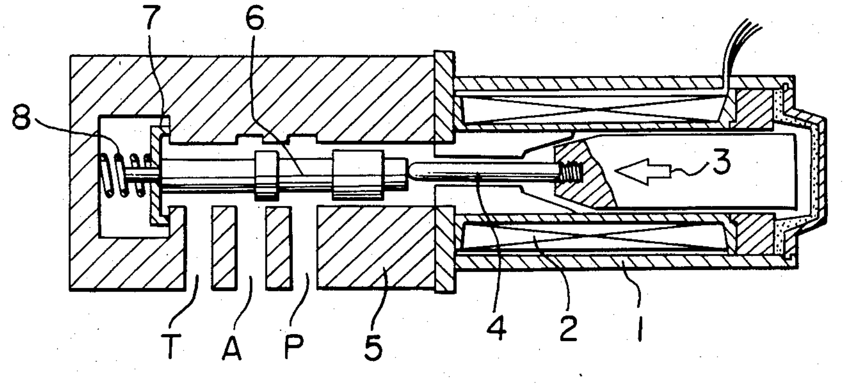
FIGURE 2
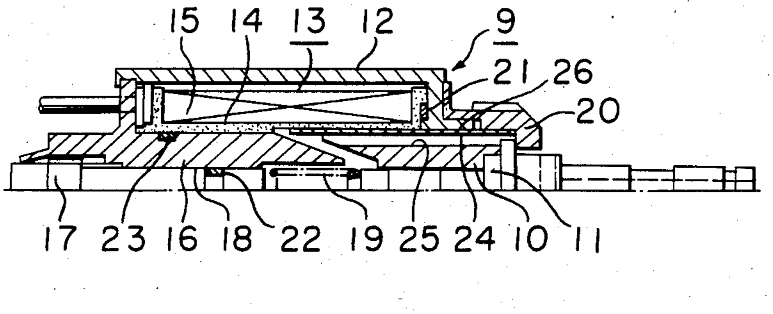
FIGURE 3
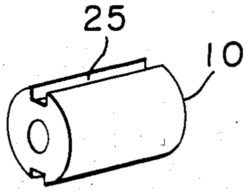
FIGURE 4
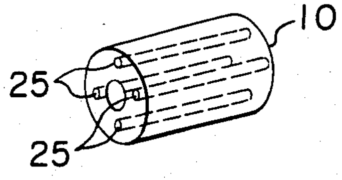

ELECTROMAGNETIC SOLENOID DEVICE FOR OIL PRESSURE CONTROL

BACKGROUND OF THE INVENTION

The present invention relates to an electromagnetic solenoid device for oil pressure control used for controlling power steering operation (oil pressure operation) of an automobile. More particularly, the present invention relates to such device for effecting a smooth movement of a movable iron core.

There has so far been known a device as shown in FIG. 1 which was published, for example, in Japanese Utility Model Publication No. 35009/1982.

In FIG. 1, a reference numeral 1 designates a solenoid device, a numeral 2 designates a solenoid coil, a numeral 3 designates a movable iron core (a plunger) capable of sliding in the direction of the arrow mark, a numeral 4 designates a push rod fixed to an end of the movable iron core 3, a numeral 5 designates a valve body (an oil pressure valve body) connected to the front end of the solenoid device 1, a numeral 6 designates a spool which is arranged in the valve body 5 and is moved in its axial direction of the valve body 5 by a pressure caused by the sliding movement of the movable iron core 3, a numeral 7 designates a spring bearing, a numeral 8 designates a spring and characters T, A and P designate oil pressure flow paths.

The operation of the solenoid device having the construction as described above will be illustrated.

When the solenoid coil 2 is actuated by current conduction from an external d.c. power source device, the movable iron core 3 is moved in the direction of the arrow mark to push the push rod 4. A pressing force of the push rod 4 is transmitted to the spool 6 and the spool 6 is caused to slide on the left hand in FIG. 1, pressing the spring 8. While the spool 6 is slidingly moved, the oil pressure flow paths T, A and P are changed.

In the conventional device constructed as abovementioned, since pressure oil (working oil) is filled in a receiving space for the movable iron core 3, a smooth sliding movement of the movable iron core 3 is prevented by pumping effect of the pressure oil.

SUMMARY OF THE INVENTION

It is an object of the present invention to eliminate the disadvantage of the conventional device and to provide an electromagnetic solenoid device for oil pressure control capable of smooth operation of a movable iron core with good efficiency and of making the structure compact.

According to the present invention, there is provided an electromagnetic solenoid device for oil pressure control comprising a movable iron core for pushing an oil pressure valve body attached at one end of the solenoid device and a space filled with working oil in which the movable iron core is slidably moved, in which at least one oil pressure releasing part is formed in the movable iron core, extending from the front end to the rear end of the movable iron core in the direction of its sliding movement.

The foregoing object, other objects as well as the specific construction of the electromagnetic solenoid device for oil pressure control will become more apparent and understandable from the following detailed description thereof, when read in conjunction with the accompanying drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross-sectional view of a conventional device;

FIG. 2 is a cross-sectional view of the upper half portion of an embodiment of the electromagnetic solenoid according to the present invention;

FIG. 3 is an orthogonal view for illustrating a main structure element in FIG. 2; and FIG. 4 is an orthogonal view of another embodiment of the element in FIG. 2.

DETAILED DESCRIPTION OF THE PREFERRED EMBODIMENTS

An embodiment of the present invention will be described with reference to drawing.

In FIG. 2, an electromagnetic solenoid device 9 of the present invention generally comprises a solenoid case 12 made of soft steel material, holding therein a coil 15 wound around coil bobbin 13, a stationary iron core 16 fixedly placed at the rear part of the solenoid device 9 and extending inside the coil 15, a movable iron core (a plunger) 10 placed in the front end part of the solenoid device 9 so as to be slidable in a space formed inside the coil 13 and a boss 20 fixed to the front end part of the solenoid case to restrict the forward movement of the movable iron core 10, the boss being connected to an oil pressure valve body (not shown).

A spool 11 is connected to the front end of the movable iron core 10 and extend into the valve body so that flow paths are changed by the movement of the spool 11 according to the movement of the movable iron core 10.

A screw rod 17 for adjusting stroke of the movable iron core 10 is screw-engaged with the central through hole 18 of the stationary iron core 16. A return spring 19 extends between the front end part of the screw rod 17 and the rear end part of the spool 11, the return spring acting to return the movable iron core 10.

An O-ring 21 is fitted to an annular groove formed between the coil bobbin 13 and the solenoid case; an O-ring 22 is fitted to an annular groove formed between the central through hole 18 of the stationary iron core 16 and the screw rod 17 and an O-ring 23 is fitted to an annular groove formed between the coil bobbin 13 and the outer circumferential surface of the stationary iron core 16 whereby leakage of the working oil filled in a space for slidably receiving the movable iron core 10, and communicated with the valve body is prevented. A sleeve 24 is fitted to a through hole 26 formed at the front part of the solenoid case 12 and the end part of the boss 20.

At least one pressure oil releasing part or passage 25 is formed in the movable iron core 10 extending from its front end to its rear end in the direction of the sliding movement of the movable iron core 10, on account of which the working oil staying in a space between the stationary iron core 16 and the movable iron core 10 flows into the valve body through the oil pressure releasing part 25 when the movable iron core 10 moves toward the stationary iron core 16.

FIG. 3 shows an embodiment of the oil pressure releasing part. Two diametrically opposing grooves 25 are formed in the outer circumferential surface of the movable iron core 10 in the axial direction by shaving operation.

FIG. 4 shows another embodiment of the oil pressure releasing part. Four through holes 25 are formed in the movable iron core 10 at symmetrical positions with respect to the axial center of it and extending in the axial direction.

It is, of course, possible to form a desired number of grooves in the movable iron core 10 at desired positions to obtain the same effect.

In the electromagnetic solenoid device described above, at least one oil pressure releasing part is formed in a movable iron core along the axial line. Accordingly, pressure oil escapes to the valve body through the releasing part when the movable iron core is actuated to thereby effecting a smooth movement of the iron core and increasing efficiency of the device.

Further, a return spring is interposed between a stationary iron core and the movable iron core; a spool is directly attached to the movable iron core and there are provided O-rings to prevent leakage of working oil in a space receiving therein the movable iron core, whereby the size of the solenoid device is as a whole reduced to be compact in comparison with the conventional solenoid device.

I claim:

1. An electromagnetic solenoid device for oil pressure control, comprising:

a valve body having oil flow paths;

a spool movable in an oil filled bore of said valve body for selectively communicating said oil flow paths;

a solenoid device fixed to said valve body, said solenoid device having a solenoid case within which are positioned a solenoid coil mounted on a coil bobbin, a movable iron core, a stationary iron core, a sealed end and another end communicating with said bore of said valve body, whereby oil from said bore communicates with oil surrounding said movable iron core, said movable iron core including rod means for pushing said spool;

a screw rod threaded into said stationary iron core;

at least one oil pressure releasing means extending through said iron core in the direction of movement of said iron core;

a return spring interposed between said stationary iron core and said movable iron core; and O-rings respectively provided at positions between said coil bobbin and said stationary iron core, between said coil bobbin and said solenoid case and between said screw rod and said stationary iron core to prevent leakage of working oil from said space for receiving said movable iron core.

2. The electromagnetic solenoid device for oil pressure control according to claim 1, wherein said oil pressure releasing means is a groove formed in the outer circumferential surface of said iron core.

3. The electromagnetic solenoid device for oil pressure control according to claim 2, wherein a plurality of said grooves are formed at diametrically opposing positions on said iron core.

4. The electromagnetic solenoid device for oil pressure control according to claim 1, wherein said oil pressure releasing means is a through hole in said iron core.

5. The electromagnetic solenoid device for oil pressure control according to claim 4, wherein a plurality of said through holes are formed at diametrically opposing positions on said iron core.

6. The electromagnetic solenoid device for oil pressure control according to claim 1, wherein said spool is directly connected to said movable iron core.

* * * * *